United States Patent
Wunder

(10) Patent No.: US 9,624,460 B2
(45) Date of Patent: Apr. 18, 2017

(54) AUTOMATED DRINK MIXING MACHINE

(71) Applicant: Nicholas Wunder, Bel Air, MD (US)

(72) Inventor: Nicholas Wunder, Bel Air, MD (US)

( * ) Notice: Subject to any disclaimer, the term of this patent is extended or adjusted under 35 U.S.C. 154(b) by 793 days.

(21) Appl. No.: 14/071,373

(22) Filed: Nov. 4, 2013

(65) Prior Publication Data

US 2015/0122130 A1   May 7, 2015

(51) Int. Cl.
   *C12G 3/04*       (2006.01)
   *B01F 3/04*       (2006.01)

(52) U.S. Cl.
   CPC ............ *C12G 3/04* (2013.01); *B01F 3/04808* (2013.01)

(58) Field of Classification Search
   CPC .............................. C12G 3/04; B01F 3/04808
   USPC ......................................... 99/277, 279, 277.1
   See application file for complete search history.

(56) References Cited

U.S. PATENT DOCUMENTS

| | | | | |
|---|---|---|---|---|
| 6,053,359 A | * | 4/2000 | Goulet | ..................... B67D 1/00 141/174 |
| 9,327,958 B2 | * | 5/2016 | Angus | .................. B67D 1/0041 |
| 2009/0210240 A1 | * | 8/2009 | Benschop | ............ G06Q 30/018 705/317 |
| 2010/0294797 A1 | * | 11/2010 | Hirschbain | ........... A47J 31/401 222/1 |
| 2012/0285986 A1 | * | 11/2012 | Irvin | ..................... B67D 1/0041 222/1 |
| 2013/0087050 A1 | * | 4/2013 | Studor | ..................... A47J 31/52 99/285 |

* cited by examiner

*Primary Examiner* — Omar Flores Sanchez
(74) *Attorney, Agent, or Firm* — Gulf Coast Intellectual Property Group

(57) ABSTRACT

An automated drink preparation apparatus that is operable to assist in the preparation of mixed drinks such as but not limited to cocktails. The automated drink preparation apparatus further includes a housing having an interior volume. Operably coupled to the housing is a drink glass conveyor system that is operable to transport drink glasses disposed thereon. Disposed within the interior volume of the housing is a plumbing system containing a plurality of storage vessels, a delivery tube network and a mixing assembly. The mixing assembly further includes a mixing chamber and a multi-port solenoid valve. Mounted to the exterior of the housing is a display screen providing access to the operating software of the automated drink preparation apparatus. An age verification module is mounted to the housing and is operable to facilitate commencement of a self-service mode. A remote interface is further included.

15 Claims, 2 Drawing Sheets

AUTOMATED DRINK MIXING MACHINE

FIELD OF THE INVENTION

The present invention relates generally to automated drink preparation, more specifically but not by way of limitation, an automated drink preparation apparatus that is operable to prepare a plurality of drinks such as but not limited to mixed drinks utilizing a multitude of stored fluids.

BACKGROUND

Whether it's in restaurants or bars, beverage sales are a significant portion of the overall revenue of these types of establishments. Many bars and or restaurants will sell hundreds of thousands of dollars in beverage sales each month. In order to produce these sales, the bars and/or restaurants must stock an inventory of a variety of different mixers and alcohol such as but not limited to distilled spirits. The inventory control of these distilled spirits is vitally important to the businesses as they are typically regulated by state authorities and must be reported thereto and there is a significant investment associated with these inventories.

One problem with mixing and dispensing conventional cocktails is the control of the amount of distilled spirits being poured for each order. Most local laws require that no more than a certain amount of distilled spirits be poured for a single serving. Controlling this amount is extremely difficult. Most conventional cocktails are prepared by a bartender or other staff member and while the distilled spirits typically have a pour control spout secured to the top of the bottle, the most common method taught is to utilize a four count to pour the correct amount. This method is extremely inconsistent and can often be abused by the bartender when preparing a drink for an acquaintance.

Another issue with business issue for restaurants and bars that sell mixed drinks is providing the staffing to perform these activities. Many smaller restaurant establishments cannot afford to staff a professional bartender that is dedicated to preparing drinks for the wait staff. For these smaller facilities, it is very inefficient for the wait staff to prepare their own drinks as it compromises the table service they are providing. Additionally, preparing mixed drinks typically requires training and/or state certification, which a waiter may not possess.

Accordingly, there is a need for a drink preparation apparatus that is operable to store and dispense a plurality of distilled spirits and/or mixers in order to facilitate not only a consistent product but further to enhance the businesses ability to control inventory.

SUMMARY OF THE INVENTION

It is the object of the present invention to provide an automated drink preparation apparatus that is operable to store and dispense a plurality of mixed drink.

Another object of the present invention is to provide an automated drink preparation apparatus operable to store distilled spirits and mixers that includes a central processing unit that controls the operation of the drink preparation apparatus.

A further object of the present invention is to provide an automated drink preparation apparatus operable to prepare mixed drinks that includes a preprogrammed menu of a plurality of drink recipes for a user to select.

Still another object of the present invention is to provide an automated drink preparation apparatus that further includes a conveyor system so as to provide a method of moving glassware through the drink dispensing area further facilitating the preparation of more than one drink.

An additional object of the present invention is to provide an automated drink preparation apparatus that includes a control screen wherein the control screen facilitates the programming and interface with the drink preparation apparatus.

Yet a further object of the present invention is to provide an automated drink preparation apparatus that further includes an internal container operable to store and dispense ice into a glass.

Another object of the present invention is to provide an automated drink preparation apparatus that includes a remote table interface facilitating the programming of a drink preparation order.

Yet an additional object of the present invention is to provide an automated drink preparation apparatus that includes an age verification component that verifies the age of the individual ordering a drink when the drink preparation apparatus is being operated in a self-serve mode.

Another object of the present invention is to provide an automated drink preparation machine that is operable to monitor the inventory amount that is disposed within each storage vessel.

To the accomplishment of the above and related objects the present invention may be embodied in the form illustrated in the accompanying drawings. Attention is called to the fact that the drawings are illustrative only. Variations are contemplated as being a part of the present invention.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION

Figure 1:
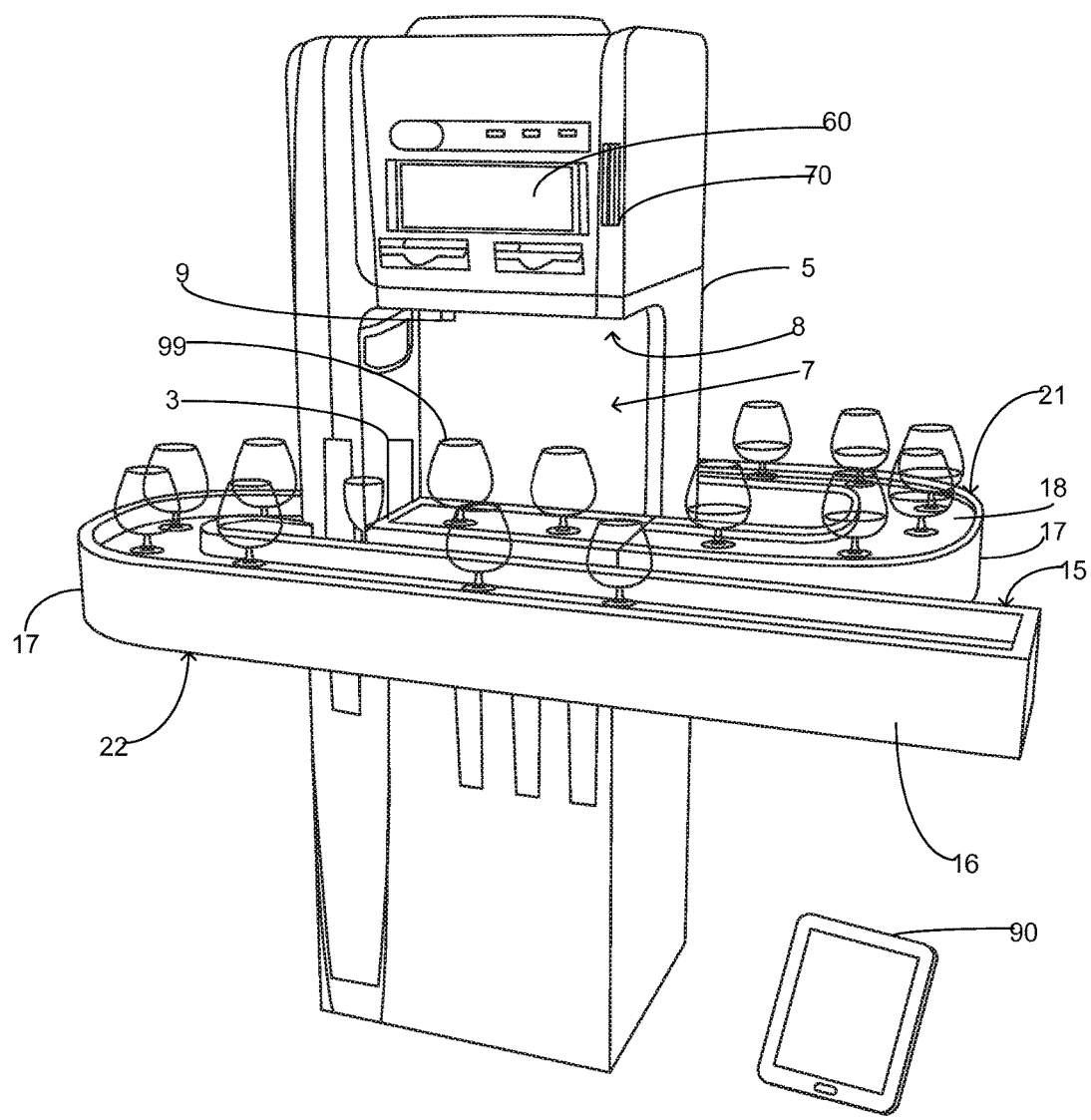
FIG. 1 is a perspective view of the present invention.

Referring now to the drawings submitted herewith, wherein various elements depicted therein are not necessarily drawn to scale and wherein through the views and figures like elements are referenced with identical reference numerals, there is illustrated an automated drink preparation apparatus 100 constructed according to the principles of the present invention.

Referring in particular to FIG. 1, the automated drink preparation apparatus 100 includes a housing 5 that is generally rectangular in shape having an interior volume 2 and manufactured from a suitable durable material such as but not limited to metal or plastic. The automated drink preparation apparatus 100 is operably coupled to a convention power source such as but not limited to a 120/240-volt electrical outlet. Further, the automated drink preparation apparatus 100 is operably coupled to the Internet utilizing a conventional LAN or wireless connection. The housing 5 includes a dispensing zone 7 that is a recessed portion proximate the vertical midpoint of the housing 5. The dispensing zone 7 is the area in which an exemplary glass 99 is filled with a beverage via the discharge nozzle 9 located near the upper end 8 of the dispensing zone 7. The discharge nozzle 9 is a generally annular shaped tube having a hollow passage therethrough that is operably coupled to the plumbing system 1 disposed with the interior volume of the housing 5. While illustrated herein as extending partially into the dispensing zone 7, it is contemplated within the scope of the present invention that the discharge nozzle 9 could be manufactured in numerous different lengths and extend into the dispensing zone 7 in a plurality of positions. Furthermore, while a single discharge nozzle 9 is illustrated herein, it is contemplated within the scope of the present invention that more than one discharge nozzle could be present. Utilizing more than one discharge nozzle 9 would facilitate the filling of more than one exemplary glass 99 with the same drink that had been ordered and input into the automated drink preparation apparatus 100. This configuration would facilitate the faster delivery of drink orders wherein the drink order consists of multiple quantities of the same type of drink.

Operably coupled to the housing 5 is a conveyor system 15. The conveyor system 15 consists of a body 16 that is elongated in manner and generally rectangular in shape having rounded corners 17. The conveyor system 15 consists of a loading portion 21 and a receiving portion 22. The loading portion 21 is operable to receive a plurality of exemplary glasses 99 in preparation to be transitioned into the dispensing zone 7. Disposed within the loading portion 21 of the conveyor system 15 is an electrical motor (not illustrated herein) that is operable to drive the conveyor belt 18. The electrical motor is a conventional stepper motor. As is known in the art, electrical motors can be programmed to move in discrete steps. This type of motor is desirable for the conveyor belt 18 of the loading portion 21 as it facilitates the appropriate location of the exemplary glass 99 during operation of the automated drink preparation apparatus 100. While not particularly illustrated herein, it is contemplated within the scope of the present invention that the conveyor belt 18 further includes indicia on the surface thereof to indicate where the exemplary glasses 99 should be placed. The electrical motor disposed within the body 16 of the conveyor system 15 is operably coupled to the central processing unit 20. The central processing unit 20 is a conventional computer-processing unit having the necessary electronics to store, receive, transmit and manipulate data. The central processing unit 20 has loaded within the memory thereof, an operating software that is configured to facilitate control of the automated drink preparation apparatus 100. Subsequent receiving a drink order, the conveyor belt 18 of the loading portion 21 is moved in order to place an exemplary glass 99 underneath the discharge nozzle 9 in preparation for dispensing of a beverage. While a stepper motor has been disclosed herein for operating the conveyor belt 18 of the loading portion 21, it is further contemplated within the scope of the present invention that the conveyor system 15 could utilize a plurality of sensors such as but not limited to optical sensors and weight sensors to locate, determine and position the exemplary glasses 99 in order to ensure the appropriate position for dispensing a beverage thereinto.

The conveyor belt 24 disposed within the receiving portion 22 of the conveyor system 15 is operably independent of the conveyor belt 18 of the loading portion 21. As the exemplary glasses 99 pass through opening 3 the exemplary glasses 99 are transferred to conveyor belt 24. The conveyor belt 24 is operable to move exemplary glasses 99 from proximate the dispensing zone 7 to the end 27 of the receiving portion 22 of the conveyor system 15. The conveyor belt 24 is operated by a second independent conventional electric motor not illustrated herein disposed within the body 16 of the receiving portion 22 that is operably coupled to the central processing unit 20. Those skilled in the art will recognize that numerous types of electric motors could be utilized to operate the conveyor belt 18. Furthermore, it is contemplated within the scope of the present invention that the receiving portion 22 of the conveyor system 15 could further include a plurality of sensors such as but not limited to optical sensors to assist in the desired positioning of the exemplary glasses 99 along the receiving portion 22. Utilizing a conveyor belt 18 within the loading portion 21 and conveyor belt 24 disposed within the receiving portion 22 facilitates the proper placement of exemplary glasses 99 within the dispensing zone 7 for filling while allowing, by way of example and not limitation, a single exemplary glass 99 to be moved such that the exemplary glass 99 is moved ensuing being filled with a beverage to be proximate the end 27. While not illustrated herein, the conveyor belt 24 includes indicia such as but not limited to belt reference numbers. As further discussed herein, subsequent the ordering of a drink, a belt reference number will be provided to a user of the automated drink preparation apparatus 100. The belt reference number provides a means for a user to identify the location of the prepared drink on conveyor belt 24.

Figure 2:
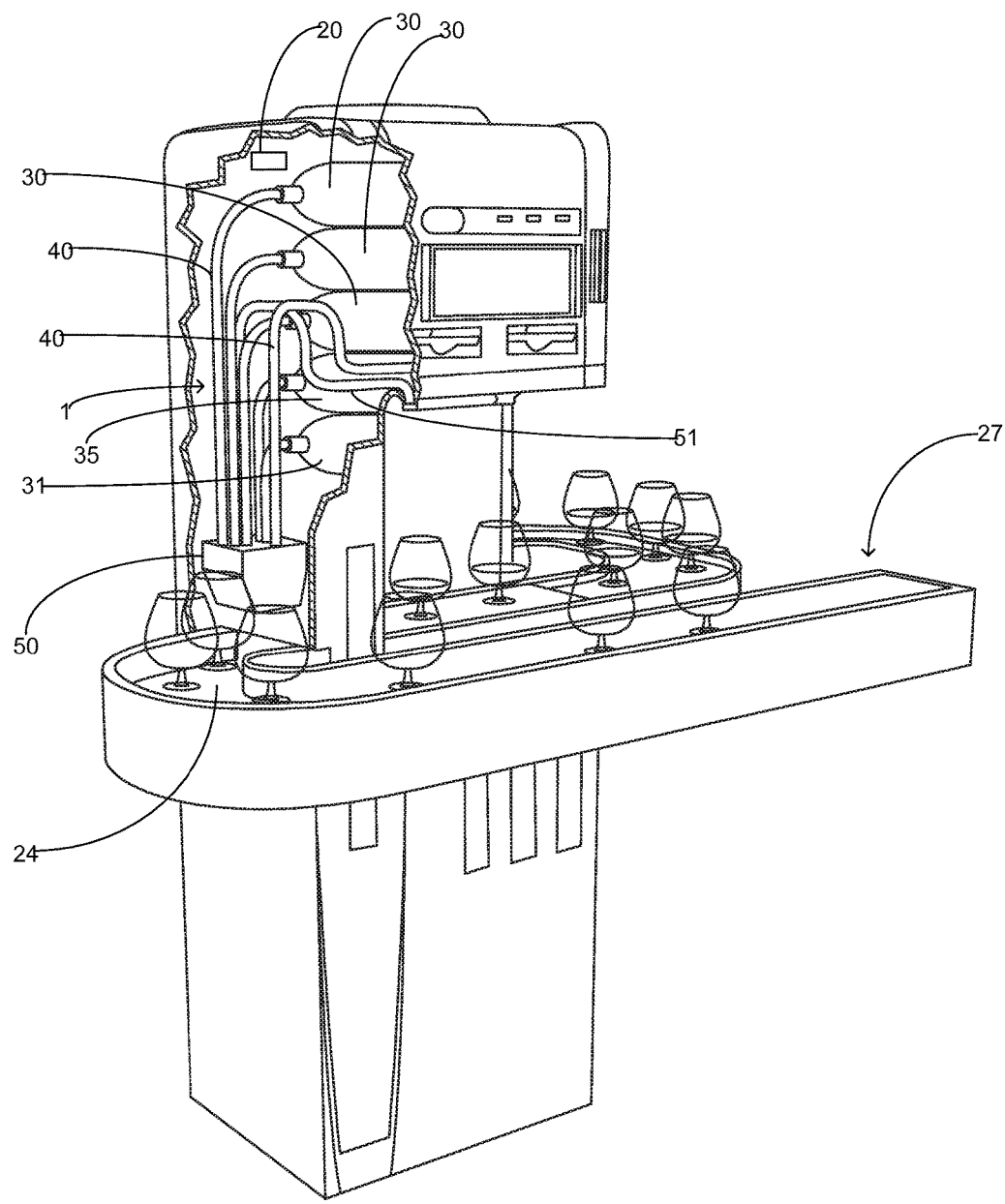
FIG. 2 is a cross-sectional view of the present invention.

Referring in particular to FIG. 2 herein, a cross-sectional view of the automated drink preparation apparatus 100 is illustrated therein. The plumbing system 1 disposed within the interior volume of the housing 5 is operable to store beverage components and other media required to produce a beverage, provide mixing thereof and further provide aliquoting into an exemplary glass 99. The plumbing system 1 includes a plurality of storage vessels 30. The storage vessels 30 are generally cylindrical in shape being substantially hollow having an interior volume configured to store and retain a plurality of drink producing components therein. The storage vessels 30 are manufactured from a suitable durable material such as but not limited to stainless steel. The storage vessels 30 are illustrated as being arranged in a vertically stacked configuration herein but it is contemplated within the scope of the present invention that the storage vessels 30 could be mounted within the interior volume of the housing 5 in numerous different configurations. The storage vessels 30 are operable to store and dispense into the plumbing system 1 liquids such as but not limited to mixers and various types of alcohol. It is further contemplated within the scope of the present invention that the storage vessels 30 could be configured to maintain the temperature thereof at a temperature that is different than that of its external environment. More specifically but not by way of limitation, the storage vessels 30 could be configured with a thermoelectric cooling apparatus in order to maintain the contents disposed within the interior volume of the storage vessel 30 at a temperature that is less than that of its surroundings. While not illustrated herein, the storage vessels 30 further include sensors that are operably coupled to the central processing unit 20 so as to provide data regarding the ingredient volume level disposed within each storage vessel 30.

One of the storage vessels 30 is operable to store and dispense solid material, more specifically ice. The ice storage vessel 31 is a temperature-controlled vessel that is configured to receive ice therein and store for subsequent dispensing. It is contemplated within the scope of the present invention that the ice storage vessel 30 is either operable to receive ice from an external source via an opening in the housing 5 and the ice storage vessel 30 or that a conventional icemaker is disposed within the housing 5 of the automated drink preparation apparatus 100 wherein the icemaker is configured to maintain a programmed level of ice within the ice storage vessel 31. In addition to the ice storage vessel 30, another storage vessel 30 is operable to be configured as a cleaning solution vessel 35. The cleaning solution vessel 35 is operable to receive, store and dispense a cleaning solution at the desired programmed intervals. Those skilled in the art will recognize that numerous different cleaning solutions could be disposed within the cleaning solution vessel 35. Utilizing the cleaning solution vessel 35 inhibits carryover contamination from different drink order types. For example but not by way of limitation, if a first drink is prepared utilizing heavy syrups and/or mixers for a tropical drink and a second drink is prepared that is simple in ingredients such as a gin and tonic, the central processing unit 20 is programmed to dispense an amount of cleaning solution from the cleaning solution vessel 35 into the plumbing system 1 to ensure that the ingredients from the first drink mixture are removed and will not be introduced into the second drink preparation. While no particular amount of storage vessels 30 are required, good results have been achieved utilizing at least fifteen storage vessels 30.

The storage vessels 30 have operably coupled thereto delivery tubes 40. The delivery tubes 30 are manufactured from a suitable durable material such as but not limited to food-grade plastic and have a hollow passage there through so as to transport ingredients disposed within the storage vessels 30 to the mixing assembly 50. Subsequent all ingredients being transported to the mixing assembly 50, the solution is then transferred to the discharge nozzle 9 via the discharge tube 51. Those skilled in the art will recognize that the delivery tubes 30 could be physically arranged/configured within the interior volume of the housing 5 in numerous different manners.

The mixing assembly 50 includes a plurality of walls 52 integrally formed to create an interior volume of sufficient size to mix a plurality of ingredients from the storage vessels 30. While not illustrated herein the mixing assembly 50 includes a conventional multi-port solenoid valve and a pump that is operably coupled to all of the delivery tubes 40. The mixing assembly 50 is further operably coupled to the central processing unit 20 and receives signals therefrom. The multi-port solenoid valve and pump disposed within the mixing assembly 50 functions to draw the required amount and type of ingredients from the storage vessels 30 in order to prepare a particular beverage. It is contemplated within the scope of the present invention that the flow of the various liquids into the mixing chamber will facilitate the appropriate mixing of the ingredients. It is additionally contemplated within the scope of the present invention that the mixing chamber could include an agitator to further facilitate the combining of the ingredients in the mixing assembly 50. Utilization of the multi-port solenoid valve enables precise amounts of materials to be extracted from the storage vessels 30 as required to prepare a drink according to a recipe programmed within the central processing unit 20. Employment of a single multi-port solenoid valve reduces the quantity of parts within the automated drink preparation apparatus 100 so as to simplify troubleshooting and maintenance procedures. It is contemplated within the scope of the present invention that the mixing assembly 50 could be manufactured in numerous different sizes and shapes in order to accommodate the manufacturing of automated drink preparation apparatus 100 of various sizes and capacities.

Illustrated herein in block diagrammatic format, the central processing unit 20 disposed within the housing 5 is operable to provide control of the automated drink preparation apparatus 100. The central processing unit 20 is operably coupled to the display screen 60. The display screen 60 is a conventional LCD display touch screen that is mounted on the exterior of the housing 5 above the dispensing zone. The display screen 60 provides a graphical interface to program the automated drink preparation apparatus 100. Those skilled in the art will recognize that the display screen 60 could be manufactured in numerous different sizes and additionally be mounted in various positions on the housing 5. The central processing unit 20 contains sufficient memory therein to store a drink recipe database. The drink recipe database is visually accessible via the display screen 60. As needed, a user can access the drink recipe database to search for a drink recipe that has been ordered by a customer. Subsequent selecting the desired drink recipe, the central processing unit 20 will begin transmitting signals to the mixing assembly 50 to retrieve the required drink ingredients from the storage vessels 30 containing the needed ingredients and transfer the programmed amount to the mixing assembly 50. Additionally, the central processing unit 20 provides to a user via the display screen a belt reference number for the drink order that has been inputted. The belt reference number provides a method of identifying the position of the prepared drink on the conveyor belt 24. Ensuing being transferred to the mixing assembly 50, the ingredients are mixed therein and transferred to the discharge nozzle 9 via the discharge tube 51. The central processing unit 20 is further operably coupled to sensors disposed within the storage vessels 30 so as to provide reporting to a user of the automated drink preparation apparatus 100. More specifically but not by way of limitation, the central processing unit 20 is operable to provide inventory reports, consumption reports and user access reports to a user via the display screen 60. Those skilled in the art will recognize that the central processing unit 20 could be programmed to provide numerous different types of reports to a user containing various metrics therein.

Located on the exterior surface of the housing 5 adjacent to the display screen 60 is an age verification module 70. The age verification module 70 is operably coupled to the central processing unit 20 and is configured to scan and retrieve data from identification cards such as but not limited to driver's licenses. The age verification module 70 utilizes optical scanners and/or magnetic strip readers to retrieve data from cards such as but not limited to credit cards and identification cards. The age verification module 70 provides the functionality for the automated drink preparation apparatus 100 to function as a self-serve machine. Utilizing the age verification module 70, a user will position their driver's license so as to read by the age verification module 70. The age verification module 70 will transmit the data read from the driver's license to the central processing unit 20 wherein the central processing unit 20 verifies the age of the user inputting the driver's license. Subsequent verification of a legal drinking age, the user is provided prompts on the display screen 60 that will facilitate the ordering of a drink. Additionally, during the process of ordering a drink, the age verification module 70 is utilized to accept payment for the drink via a credit card. It is further contemplated within the scope of the present invention that the central processing unit 20 will maintain a temporary database of each user's information within a programmed time period so as to limit the quantity of beverages that can be purchased over a programmed time period. By way of example but not by way of limitation, the central processing unit 20 could be programmed to inhibit the sale of a beverage that exceeds more than one per hour for the same user. Those skilled in the art will recognize that the central processing unit 20 could be programmed in a variety of different manners to control the consumption of beverages when the automated drink preparation apparatus 100 is being utilized in a self-serve mode. The automated drink preparation apparatus 100 is operable in a first mode and a second mode. In its first mode, as previously mentioned the automated drink preparation apparatus 100 functions as a self-serve style machine. In its second mode, the automated drink preparation apparatus 100 is operated by employees of a restaurant and/or bar. In this second mode, it is contemplated within the scope of the present invention that the age verification module 70 is further configured to read conventional magnetic strips so as to facilitate the use of cards such as but not limited to employee identification cards for employees to initiate the use of the automated drink preparation apparatus 100.

As shown in particular in FIG. 1, a remote interface 90 is illustrated therein. The remote interface 90 allows a user to program and/or operate the automated drink preparation apparatus 100 from a remote location. The remote interface 90 is a tablet PC that is loaded with an operating software functioning to provide interface and control of the automated drink preparation apparatus 100. The software loaded on the remote interface 90 is an identical representation of the graphical interface displayed to the user on the display screen 60. The remote interface 90 is operably coupled to the automated drink preparation apparatus 100 utilizing conventional wireless communication protocols such as but not limited to Bluetooth. The remote interface 90 allows a server to place a drink order from a customer's table as the customer provides the drink order request. Implementation of the remote interface 90 significantly improves the time required to delivery a drink order subsequent the customer's request. While one remote interface 90 is illustrated herein, it is contemplated within the scope of the present invention that the automated drink preparation apparatus 100 could have more than one remote interface 90 operably coupled therewith.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An automated drink preparation apparatus comprising:
   a housing, said housing having a plurality of integrally formed walls, said housing having an interior volume;
   a conveyor system, said conveyor system being operably coupled to said housing, said conveyor system having a first portion and a second portion, said conveyor system operable to receive and transport a plurality of drink glasses, wherein said second portion of said conveyor system further includes belt reference numerals, said belt reference numerals including indicia to provide confirmation of a drink disposed within a drinking glass superposed on said second portion of said conveyor system;
   a plumbing system, said plumbing system being disposed within said interior volume of said housing, said plumbing system including a plurality of storage vessels, said storage vessels operable to receive, store ingredients required to produce a beverage, said plumbing system further including a mixing assembly, said mixing assembly being operably coupled to said plurality of storage vessels utilizing a multitude of delivery tubes, wherein at least one of said plurality of storage vessels is temperature controlled and is operable to maintain a temperature that is different than that of its surroundings;
   a central processing unit, said central processing unit having the necessary electronics to store, receive, manipulate and transmit data, said central processing unit operably coupled to said conveyor system and said plumbing system;
   an age verification module, said age verification module being secured to said housing, said age verification module operable to receive data from a driver's license so as to facilitate age verification by said central processing unit;
   a display screen, said display screen mounted on said housing, said display screen operable to provide a graphical interface for operation of the automated drink preparation apparatus;
   a dispensing zone, said dispensing zone integrally formed with said housing, said dispensing zone operable to receive a drinking glass for filling with a beverage, wherein the first portion of said conveyor system is operable to transport drink glasses into said dispensing zone.

2. The automated drink preparation apparatus as recited in claim 1, and further including a remote interface, said remote interface having the necessary electronics and software so as to operate the automated drink preparation apparatus from a remote location.

3. An automated drink preparation apparatus operable to provide a plurality of mixed drinks to a user and provide inventory control of the ingredients disposed therein comprising:
   a housing, said housing having a plurality of integrally formed walls, said housing having an interior volume, said housing further including a dispensing zone, said dispensing zone integrally formed with said housing being a recessed portion thereof, said dispensing zone having an input side and an output side;
   a first conveyor belt, said first conveyor belt operably coupled with said housing, said first conveyor belt being mounted on said housing such that said first conveyor belt is operable to transport drink glasses towards said input side of said dispensing zone;
   a second conveyor belt, said second conveyor belt operably coupled with said housing, said second conveyor belt being mounted on said housing such that said second conveyor belt is operable to transport drink glasses away from said output side of said dispensing zone;
   a plumbing system, said plumbing system being disposed within said interior volume of said housing, said plumbing system including a plurality of storage vessels, said storage vessels operable to receive, store ingredients required to produce a beverage, said plumbing system further including a mixing assembly, said mixing assembly further including a mixing chamber having an interior volume of sufficient size to accommodate a fluid mixture therein, said mixing assembly being operably coupled to said plurality of storage vessels utilizing a multitude of delivery tubes;

a central processing unit, said central processing unit having the necessary electronics to store, receive, manipulate and transmit data, said central processing unit further having operating software stored therein, said operating software configured to control the operation of the automated drink preparation apparatus, said central processing unit operably coupled to said first conveyor belt and said second conveyor belt and said plumbing system;

an age verification module, said age verification module being secured to said housing, said age verification module operable to receive data from a driver's license so as to facilitate age verification by said central processing unit.

4. The automated drink preparation apparatus as recited in claim 3, wherein at least one of said plurality of storage vessels is configured to maintain a temperature that is lower than that of its surroundings.

5. The automated drink preparation apparatus as recited in claim 4, and further including a remote interface, said remote interface having the necessary electronics and software so as to operate the automated drink preparation apparatus from a remote location.

6. The automated drink preparation apparatus as recited in claim 5, and further including a display screen, said display screen operably coupled to said central processing unit, said display screen providing a graphical interface to engage with said operating software.

7. The automated drink preparation apparatus as recited in claim 6, wherein said operating software is operable to provide a belt reference numeral subsequent a drink order being input into said operating software.

8. The automated drink preparation apparatus as recited in claim 7, wherein said second conveyor belt further includes belt reference numerals, said belt reference numerals including indicia to provide confirmation of a drink disposed within a drinking glass superposed on said second conveyor belt.

9. The automated drink preparation apparatus as recited in claim 8, wherein said central processing unit is operable to provide a plurality of reports, said plurality of reports being generated to a user to include metrics for inventory control of the ingredients stored within said plurality of storage vessels.

10. An automated drink preparation apparatus wherein the automated drink preparation apparatus facilitates the automated preparation of a mixed drink comprising:

a housing, said housing having a plurality of integrally formed walls, said housing having an interior volume, said housing further including a dispensing zone, said dispensing zone integrally formed with said housing being a recessed portion thereof, said dispensing zone having an input side and an output side;

a drink glass conveyor system, said drink glass conveyor system further including a first conveyor belt, said first conveyor belt operably coupled with said housing, said first conveyor belt being mounted on said housing such that said first conveyor belt is operable to transport drink glasses towards said input side of said dispensing zone, said drink glass conveyor system further including a second conveyor belt, said second conveyor belt operably coupled with said housing, said second conveyor belt being mounted on said housing such that said second conveyor belt is operable to transport drink glasses away from said output side of said dispensing zone;

a plumbing system, said plumbing system being disposed within said interior volume of said housing, said plumbing system including a plurality of storage vessels, said storage vessels operable to receive, store ingredients required to produce a beverage, said plumbing system further including a multitude of delivery tubes, said multitude of delivery tubes having a first end and a second end, said first end of each of said multitude of delivery tubes operably coupled with said plurality of storage vessels, said plumbing system further including a mixing assembly, said mixing assembly further including a mixing chamber having an interior volume of sufficient size to accommodate a fluid mixture therein, said mixing assembly further including a multi-port solenoid valve, said multi-port solenoid valve being operably coupled to said second ends of said multitude of delivery tubes, said mixing assembly further including a pump, said pump operably coupled to said multi-port solenoid valve, said pump and said multi-port solenoid valve operable to draw ingredients from said plurality of storage vessels and deposit into said mixing chamber;

a central processing unit, said central processing unit having the necessary electronics to store, receive, manipulate and transmit data, said central processing unit further having operating software stored therein, said operating software configured to control the operation of the automated drink preparation apparatus, said central processing unit operably coupled to said drink conveyor system and said plumbing system, said central processing unit further including a drink database, said drink database having a plurality of drink recipes stored therein;

a display screen, said display screen operably coupled to said central processing unit, said display screen providing a graphical interface to engage with said operating software;

an age verification module, said age verification module being secured to said housing, said age verification module operable to receive data from a driver's license so as to facilitate age verification by said central processing unit; and wherein in said first mode the automated drink preparation apparatus is operable to function as a self-serve vending style machine.

11. The automated drink preparation apparatus as recited in claim 10, said central processing unit is operable to provide a plurality of reports to include at least one of the following types of reports: inventory reports, consumption reports and user access reports.

12. The automated drink preparation apparatus as recited in claim 11, and further including a remote interface, said remote interface being a tablet PC, said remote interface having the necessary electronics and operating software so as to operate the automated drink preparation apparatus from a remote location.

13. The automated drink preparation apparatus as recited in claim 12, wherein said operating software is operable to provide a belt reference numeral subsequent a drink order being input into said operating software.

14. The automated drink preparation apparatus as recited in claim 13, wherein said second conveyor belt od said drink conveyor system further includes a plurality of belt reference numerals, said plurality of belt reference numerals including indicia to provide confirmation of a drink type disposed within a drinking glass superposed on said second conveyor belt adjacent to one of said plurality of belt reference numerals.

15. The automated drink preparation apparatus as recited in claim 14, wherein one of said plurality of storage vessels is configured to store a cleaning solution, wherein the cleaning solution is operable to clean the mixing assembly intermediate production of various types of drinks.

\* \* \* \* \*